(12) United States Patent
Pokrandt

(10) Patent No.: US 11,061,989 B2
(45) Date of Patent: Jul. 13, 2021

(54) METHOD AND APPARATUS FOR CHECKING A CONFIGURATION PARAMETER VALUE

(71) Applicant: SICK AG, Waldkirch/Breisgau (DE)

(72) Inventor: Peter Pokrandt, Au am Rhein (DE)

(73) Assignee: SICK AG, Breisgau (DE)

( * ) Notice: Subject to any disclaimer, the term of this patent is extended or adjusted under 35 U.S.C. 154(b) by 0 days.

(21) Appl. No.: 16/583,667

(22) Filed: Sep. 26, 2019

(65) Prior Publication Data

US 2020/0104339 A1  Apr. 2, 2020

(30) Foreign Application Priority Data

Sep. 28, 2018 (EP) ..................... 18197531

(51) Int. Cl.
*G06F 17/10* (2006.01)
*G06F 16/957* (2019.01)
*G06F 16/958* (2019.01)
*G06F 9/445* (2018.01)
*G09G 3/20* (2006.01)
*G09G 5/30* (2006.01)

(52) U.S. Cl.
CPC ...... *G06F 16/9577* (2019.01); *G06F 9/44505* (2013.01); *G06F 16/958* (2019.01); *G09G 3/2003* (2013.01); *G09G 5/30* (2013.01)

(58) Field of Classification Search
CPC .............. G06F 16/9577; G06F 16/958; G06F 9/44505; G09G 3/2003; G09G 5/30
See application file for complete search history.

(56) References Cited

U.S. PATENT DOCUMENTS

| 5,742,280 A | * | 4/1998 | Ohyama | ............. G06F 3/04883 345/173 |
| 9,513,606 B1 | * | 12/2016 | Larsen | ................... B25J 9/1676 |
| 2002/0198611 A1 | | 12/2002 | Stejskal | |

(Continued)

FOREIGN PATENT DOCUMENTS

| DE | 4332143 A1 | 3/1995 |
| DE | 102008062623 A1 | 6/2010 |

(Continued)

OTHER PUBLICATIONS

European Search Report dated Mar. 14, 2019 corresponding to application No. 18197531.9-1216.

*Primary Examiner* — Shahid K Khan
(74) *Attorney, Agent, or Firm* — Nath, Goldberg & Meyer; Jerald L. Meyer

(57) ABSTRACT

A method is described for checking a configuration parameter value set at an electronically configurable apparatus. The apparatus has a user interface having a display device, wherein the user interface is configured to display a set configuration parameter value using a computer program, in particular a browser, for presenting data at the display device. The method comprises: displaying at least one first version of the configuration parameter value using a first presentation form of the computer program; generating a second version of the set configuration parameter value on the basis of the first version; and checking the set configuration parameter value on the basis of the first version and at least of the second version.

14 Claims, 3 Drawing Sheets

(56) References Cited

U.S. PATENT DOCUMENTS

| | | | |
|---|---|---|---|
| 2004/0223002 A1* | 11/2004 | Fukaya | G06F 3/0488 345/619 |
| 2006/0074514 A1 | 4/2006 | Mukai et al. | |
| 2007/0179644 A1 | 8/2007 | Ravish et al. | |
| 2008/0033947 A1* | 2/2008 | Bermingham | G06Q 30/02 |
| 2008/0066052 A1* | 3/2008 | Wolfram | G06F 3/01 717/109 |
| 2008/0240577 A1* | 10/2008 | Aartsen | H04N 7/181 382/218 |
| 2011/0298579 A1* | 12/2011 | Hardegger | G01S 17/10 340/3.1 |
| 2012/0089659 A1* | 4/2012 | Halevi | G06F 3/04842 709/201 |
| 2013/0113303 A1* | 5/2013 | Somal | H02P 3/06 307/326 |
| 2015/0332463 A1* | 11/2015 | Galera | G06K 9/00201 382/103 |
| 2016/0094584 A1* | 3/2016 | Mehta | G06F 21/604 726/1 |
| 2019/0108419 A1* | 4/2019 | Coven | G06F 9/44505 |

FOREIGN PATENT DOCUMENTS

| | | |
|---|---|---|
| DE | 102013218269 A1 | 3/2015 |
| DE | 102015208273 A1 | 11/2016 |
| WO | 2015128341 A1 | 9/2015 |

* cited by examiner

METHOD AND APPARATUS FOR CHECKING A CONFIGURATION PARAMETER VALUE

FIELD

The present invention relates to a method of checking a configuration parameter value set at an electronically configurable apparatus. The apparatus has a user interface having a display device by which an operator can configure the apparatus. The operator can in particular configure the apparatus in that a respective configuration parameter is set to a desired value. The set value can then be used for the control of the apparatus, e.g. in that a control unit of the apparatus carries out predefined or dynamic control programs in dependence on one or more set configuration parameter values.

BACKGROUND

The user interface of the apparatus is generally configured to display a set configuration parameter value using a computer program, in particular a browser, to present data at the display device.

Computer programs for presenting data are known and are used in practically every commercial PC when the user of the PC wants to have contents of a website displayed on the monitor. The computer program here makes possible a user friendly navigation through an "internet site" that comprises a plurality of pages. Such computer programs are also known as so-called web browsers or browsers, e.g. Internet Explorer, Firefox, Chrome, Safari, and the like.

Computer programs for presenting data can advantageously also be used to set the configuration parameters via the user interface. Known browsers can in particular also be used, with it, however, also being possible to provide specifically adapted browser programs that can differ from known browsers ("standard browsers" such as Internet Explorer).

Increased safety demands often have to be made on the apparatus to be configured. The apparatus can, for example, be an industrial machine or a part thereof from which potential hazards for persons can emanate. It is understood that considerably increased security demands have to be made on the control of such an apparatus, in particular with respect to a reliable configuration, to ensure a safe operation of the apparatus with simple PCs. The apparatus can generally then also be called a safety apparatus.

Against the background of the increased safety demands, it should preferably be ensured at all times that a set configuration parameter value corresponds to a desired configuration parameter value. It therefore has to be checked here that the set configuration parameter value coincides with the desired value. For this purpose, the control and the user interface can be configured such that a set value has to be confirmed by an operator before the set value is used as the basis for a control of the apparatus. In other words, the effective configuration of the apparatus is only triggered in dependence on the set value when the set value has previously been checked and confirmed by the operator.

However, errors in the form of an incorrect display of the set configuration parameter value can occur with respect to the user interface. Such errors should be avoided because such errors can have a serious effect on the safety of the apparatus and on any systems dependent thereon.

A sensor apparatus by which a predefined region is to be monitored can be named as an example. A set configuration parameter value can then in particular be formed by a shutdown distance, i.e. a predefined distance up to which an object may approach the sensor apparatus before a shutdown signal is generated (e.g. to shut down a hazardous machine). It can occur on a presentation or display error of the shutdown distance value input by an operator that the operator confirms a value that differs from the actually set value in the apparatus (e.g. a shutdown distance of 1 m can be displayed even through a shutdown distance of 2 m is set at the apparatus). Such a discrepancy should be avoided due to the safety critical function of the shutdown distance.

To avoid errors with respect to set configuration parameter values, a safeguarding by check numbers is known so that transfer errors and storage errors can be recognized. Furthermore, especially adapted display programs that are e.g. provided together with the apparatus as an element of the operating software of the apparatus can be used to avoid presentation errors or display errors. For safety reasons, the operating software and any display programs included therein are delivered as executable software (compiled source code) so that subsequent modifications are practically precluded. In this respect, it can be assumed with sufficient probability in most cases that a set configuration parameter value is correctly displayed.

However, cloud-oriented methods that no longer have the presentation software integrated are increasingly being used now. This development is based on the circumstance that modern apparatus are no longer necessarily considered as systems closed in themselves and are operated accordingly. In the course of digitization, networked systems are increasingly being sought that are characterized by an interaction of the most varied components. Standard hardware and standard software should frequently be used here and it cannot simply be assumed that the respective components are also error-free and satisfy increased safety demands. It should, for example, be made possible also to configure an apparatus using a standard PC or a central server (e.g. "web configuration"). Standard web browsers should preferably be used here that are practically always installed or can at least be easily downloaded from the internet for this purpose. The configuration can be of a very user friendly design since the setting of the configuration parameters can also be carried out remotely and from different locations. For example, a tablet PC can be used for the control that is connected to an operation computer of the apparatus. Set configuration parameter values can then be displayed via a standard browser of the tablet PC, with the operator being able to confirm the displayed values to configure the apparatus. However, display errors cannot be precluded by the use of standard browsers.

SUMMARY

It is an object of the invention to provide an improved method of a safe checking of a set configuration parameter value.

The object is satisfied by a method of checking a configuration parameter value set at an electronically configurable apparatus, having at least one sensor for monitoring a monitored zone, a display device and a user interface configured to display a set configuration parameter value using a computer program for presenting data at the display device. The set configuration parameter value represents a parameter for defining the monitored zone. The computer program presenting data at the display device comprises a browser and is used for displaying at least one first version of the configuration parameter value using a first presentation form of the computer program, generating a second version of the set configuration parameter value on the basis of the first version, and checking the set configuration parameter value on the basis of the first version and at least of the second version.

With respect to an electronically configurable apparatus of the above-named kind, a method for the safe checking of a configuration parameter value set at the apparatus at least comprises the following steps:

- displaying at least one first version of the configuration parameter value using a first presentation form of the computer program;
- generating a second version of the set configuration parameter value on the basis of the first version; and
- checking the set configuration parameter value on the basis of the first version and at least of the second version.

In summary, two different versions are used to check the set configuration parameter value. The first version is preferably that version that is used as standard in the apparatus for the underlying configuration parameter and is displayed by means of a first presentation form of the computer program. The first version is then visible as the display version or as the displayed version. It therefore represents the form of the set configuration parameter value in accordance with the first version that is presented to the operator via the display device. The check within the framework of the process can thus in particular be supported on the displayed first version (that is based on the first version). It is, however, also possible to derive the second version from the first version such that any errors with respect to the first presentation form of the computer program take effect in the second version.

The first presentation form is preferably adapted to present the first version. The first presentation form is, however, potentially subject to errors and can cause a false display of the first version (e.g. when a display routine of the computer program has a programming error with respect to the first presentation form.

The second version is generated to be able to check the set configuration parameter value relative to the first version. The second version is preferably processed differently from the first version by the computer program for this purpose, with e.g. an automatic comparison of the versions or a comparison of the versions on the operator side being considered as will be explained in more detail in the following. The second version can be displayed in addition to the first version and can therefore like the first version be called a (second) display version. A computer assisted (automatic) comparison of the two versions is, however, also possible, with the second version not having to be displayed for this purpose.

The method is characterized in that it is universally compatible with the most varied browser technologies, with the method being configured such that it makes possible a check of a respective browser with respect to a presentation routine (first presentation form). Which presentation routine it is, is not necessarily decisive here. It is rather important that a second version of the set configuration parameter value is generated on the basis of the first version and the check is carried out on the basis of the two versions. The second version is independent of the first presentation form. The check is placed on a broader data foundation in this manner that takes account of the uncertainties of the browser. Advantageous embodiments of the method can be seen from the description, from the dependent claims, and from the drawings.

The first version can generally represent the set configuration parameter value in a first data form. The second version can in contrast represent the set configuration parameter value in a second data form that preferably differs from the first data form. The first data form can in particular be a text form. The text form can be formed by a text coding or generally by a character coding (e.g. as a numerical value or as a string). As mentioned above, the first data form can be that data form that is used as standard in the apparatus, in particular in the user interface. Each standard browser has a presentation routine for displaying text, for example.

The second data form can preferably be a graphical form, i.e. the set configuration parameter value can be encoded as a graphic (as a digital image or image file, e.g. a bitmap file or a jpeg file). In the second data form, the set configuration parameter value can be represented by a plurality of pixels with which at least one brightness value is respectively associated.

In accordance with an embodiment, the second version is generated in that the first version is converted into the second version using a conversion program. The conversion program is generally configured to convert data from the first data form into the second data form, that is in particular text into a graphic. The conversion program is preferably independent of the computer program so that the generated graphic e.g. does not correspond to the displayed text when the text is displayed incorrectly due to the first presentation form. The conversion program is preferably also not an element of the computer program. In other words, the second version is preferably not generated as a screenshot of the displayed first version. The second version can rather advantageously e.g. be generated by means of an image generator. Such an image generator (or image generation program) can be an executable software element of the operating software so that the second version can be directly generated using the operating software. It is, however, also conceivable to transmit the configuration parameter value encoded e.g. as text to a central server to carry out the conversion on this server. The second version can then again be transmitted to the apparatus and in particular to the user interface.

In accordance with a further embodiment, the second version of the set configuration parameter value is displayed at the display device using a second presentation form of the computer program. The two versions can e.g. be displayed directly adjacent and/or simultaneously in time. An operator of the user interface can then compare the two versions with one another and can confirm the configuration by the set configuration parameter value when the two versions are equivalent with respect to the set configuration parameter value, i.e. are identical independently of the respective presentation form.

The first version and the second version can be displayed at the display device together, in particular superposed. It is additionally or alternatively possible to display the first version and the second version at the display device in mutually different colors. The check can hereby be simplified, with comparison errors that are conceivable in principle being able to be better avoided by the operator.

The method can furthermore be configured such that at least one input element of the user interface is activated to enable the input of a check result by an operator of the apparatus. The check result can be determined at the operator side by a visual check of the set configuration parameter value on the basis of the displayed first version and/or of the displayed second version. The input element in other words therefore serves to confirm the set configuration parameter value if the check shows that no error is present.

The at least one input element is preferably only activated when the first and second versions are displayed. An accidental confirmation without a prior check can be reliably prevented in this manner.

The at least one input element can generally be configured as a graphical input element. It is thus in particular possible that at least one graphical input element is displayed at the display device in addition to the first version and to the second version. Examples for a graphical input element are Yes/No graphics, tick boxes, and the like. The display device can generally also be configured as touch sensitive, i.e. as a touchscreen, for intuitive operation. The operator can thus input a determined check result by simply touching one or more input elements at the user interface.

The display of an input element can be carried out adjacent to the displayed first and second versions or also superposed with the two versions. Additionally, the input element does not necessarily have to be visible. The element can, for example, be configured as identical with a respective displayed version and can be superposed thereon (linking to displayed version).

The apparatus can generally be configured by the set configuration parameter value. The term "configuration" means that the set configuration parameter value is used as the basis for the operation of the apparatus, i.e. the apparatus is operated in dependence on the set configuration parameter value. Such an effective configuration by the set configuration parameter value is preferably made in dependence on a prior confirmation. It can in particular be necessary that the operator inputs one or more required positive check results via the at least one input element to release the operation of the apparatus in dependence on the set configuration parameter value.

It is possible that at least one first input value of the user interface is associated with a first check result that is determined by the operator and that is based on a visual check (i.e. on the operator side) of the equivalence of the set configuration parameter value between the displayed first version and the displayed second version. Two first input elements can in particular be provided in the form of a "Yes button" (equivalence present) and of a "No button" (no equivalence). If both versions are equivalent, it can be assumed with sufficient probability that the displayed version of the configuration parameter value corresponds to the configuration parameter value actually set at the apparatus. In other words, it cannot be assumed that the parameter value was not falsified "on the way from the memory to the display".

It is understood that other first input elements (also a single input element) are also conceivable to input the same check information. The advantage of two first input elements, however, comprises the risk of an erroneous input being reduced.

It can naturally also be expedient to check the set configuration parameter value as such (in the case of a numerical value with respect to the amount). At least one second input element of the user interface can be associated with a second check result determined by the operator for this purpose that is based on a visual check (i.e. at the operator side) of the equivalence of the set configuration parameter value between the displayed first or second versions and a configuration parameter value desired by the user or operator. The at least one second input element can be configured in the same way as the at least one first input element.

Differing from the case that the first and second versions are displayed and that the operator carries out the check "manually", it is also possible to carry out the check for at least equivalence of the two versions in an automated manner. A combination of a check at the operator side and an automatic check is also conceivable to ensure maximum safety in the check.

In the case of an automatic check, the comparison of the first and second versions is carried out automatically, with an error signal automatically being generated in the case of a difference. The set value can otherwise be confirmed or rejected by a user with respect to the desired value.

The method can therefore furthermore comprise a comparison of the first and second versions to determine an equivalence of the set configuration parameter value between the first version and the second version, with an error signal being generated when no equivalence of the set configuration parameter value is determined between the first version and the second version. The comparison in particular takes place by a control unit of the apparatus and can be supported on the displayed first version and on the displayed second version. The comparison can, however, also e.g. be transferred to an external server. In the event of a generated error signal, an error can be displayed at the display device to inform the user. It is furthermore preferred that a confirmation of the displayed configuration parameter value via input elements is only possible when no error signal was generated. For example, two input elements can only be activated or displayed when it is ensured that no error signal has been generated with respect to the respective configuration parameter value.

The second version can generally be generated using an imaging program that is configured to generate an image of the first version displayed at the display device (i.e. of the first display version). The imaging program can accordingly be configured to prepare a so-called screenshot of the displayed first version. The second version can then be compared with the first version internally stored at the apparatus to carry out the automatic check.

In accordance with an embodiment of the method, a generation of a third version of the set configuration parameter value is furthermore provided on the basis of the second version. This is done in that the second version is evaluated with respect to the first data form using an evaluation program, with the third version representing the set configuration parameter value in the first data form. The method furthermore comprises a comparison of the first and third versions to determine an equivalence of the set configuration parameter value between the first version and the third version, with an error signal being generated when no equivalence of the set configuration parameter value is determined between the first version and the third version.

It is possible with respect to the evaluation of the second version that the second version is transmitted to a central server via a communication interface of the apparatus. The evaluation program can then be carried out on the central server, with the third version then being received by the central server via the communication interface. The central server can therefore communicate with the central server. More complex evaluation work can in particular be transferred in this manner.

It is alternatively even possible to transfer both the evaluation and the comparison of the first and third versions to a server. In other words, the first version and the second version can be transmitted to a central server via a communication interface of the apparatus, with the evaluation program and the step of comparison of the first version and of the third version being performed on the central server. A comparison result can then be received by the central server via the communication interface, with the comparison result indicating whether an equivalence of the set configuration parameter value has been determined between the first version and the third version. The error signal is then preferably generated in dependence on the received comparison result.

As already indicated further above, the second version can be generated using an imaging program that is configured to generate an image of the first version displayed at the display device. The evaluation is in this case preferably a computer program for automatic text recognition (text recognition program, in particular optical character recognition, OCR). Such programs are available inexpensively as standard software and can thus be easily installed and kept available on standard computers, with the recognition reliability already reaching a high level.

In accordance with a further embodiment, if no error signal is generated, at least one input element of the user interface is activated to enable the input of a check result by an operator of the apparatus, with the check result at the operator side being determined by a visual check of the set configuration parameter value on the basis of at least one version of the set configuration parameter value displayed at the display device. The at least one input element that can correspond to the second input element named further above and that can be configured in the same way is preferably associated with a check result that is based on a visual check of the equivalence of the set configuration parameter value between the displayed version and a configuration parameter value desired by the user. The displayed version can be the first, second, and/or third versions that is/are displayed at the display device. The apparatus is preferably configured or operated by the set configuration parameter value when the operator inputs the corresponding positive check result (confirmation of the set value) via the input element on a determined equivalence. The method can thus generally comprise the inputting of one or more check results by the operator.

The invention also relates to an apparatus that is electronically configurable by a configuration parameter value set at the apparatus. The apparatus has a user interface, that has a display device, and a control device. The user interface is configured to display a set configuration parameter value using a computer program, in particular a browser, to present data at the display device, and with the control device being configured to carry out the method in accordance with one of the embodiments disclosed here.

The control device of the apparatus can control an industrial machine or an industrial process (e.g. the sensor named below that can in particular be configured as a laser scanner) on the basis of the set configuration parameter value. In addition, the control device can read the configuration parameter value, that is checked as described here, from the industrial machine.

The apparatus can have at least one sensor for monitoring a monitored zone, with the set configuration parameter value representing a parameter for defining the monitored zone. The configuration parameter value thus has particular relevance with respect to operating safety to be ensured. The described checking procedure is particularly advantageous for such parameters, but is not restricted to such parameters.

BRIEF DESCRIPTION OF THE DRAWINGS

The invention will be explained only by way of example in the following with reference to the drawings in which.

DETAILED DESCRIPTION

Figure 1:
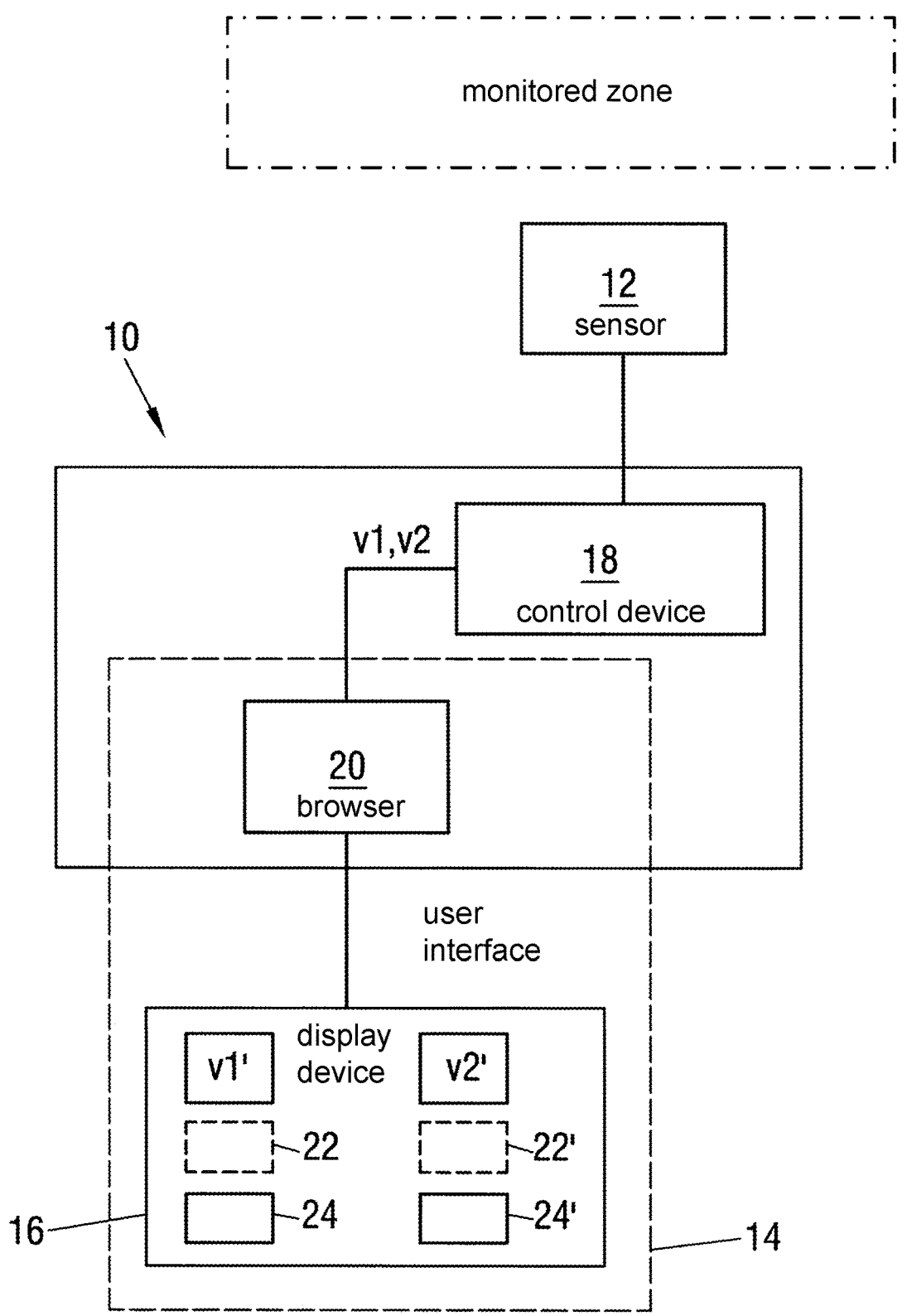
FIG. 1 shows an apparatus with a user interface.

An apparatus 10 is shown schematically in FIG. 1 that is electronically configurable by a configuration parameter value set at the apparatus 10. The apparatus 10 has a sensor 12 for monitoring a monitored zone, with the set configuration parameter value representing a parameter for defining the monitored zone.

The apparatus 10 additionally has a user interface 14 having a display device 16 that is configured as a touch sensitive screen (touchscreen). The user interface 14 is generally configured to display a configuration parameter value set at the apparatus 10 using a browser 20. The browser 20 represents a computer program (software) to present data at the display device 16. The browser 20 can be formed by a conventional web browser, e.g. Internet Explorer, Chrome, Opera, or the like.

A control device 18 of the apparatus 10 is configured to carry out a method of checking the set configuration parameter value. The set configuration parameter value is present in a first version v1 that can e.g. be stored in an internal memory of the apparatus 10. The memory (not shown) can e.g. be a non-volatile memory. The set configuration parameter value represents an electronic parameter value that is stored at the apparatus 10 or at a control means connected to the apparatus 10 and that is provided to configure an operation of the apparatus 10. The first version v1 preferably represents the set configuration parameter value in a text form, i.e. the first version v1 is preferably an electronic character encoding of the set configuration parameter value. It is preferably a standard data form of the apparatus 10, with at least some configuration parameters for operating the apparatus 10 being stored in the standard data form. The first version v1 can directly represent the set configuration parameter value, i.e. the first version v1 can form the set configuration parameter value.

A method of checking the set configuration parameter value generally serves to determine whether the first version v1 that is stored internally at the apparatus 10 is correctly displayed at the display device 16. In other words, a check should be made by the method whether the first version v1 corresponds to a displayed first version v1'. The first version v1 and the displayed first version v1' correspond to one another when they are equivalent with respect to the configuration parameter value respectively represented by the versions. The check is made with respect to potential errors of the browser 20 that is used to display the first version v1. The browser 20 is generally configured to display data in one of a plurality of presentation forms, e.g. in that the browser presents a string (text form), on the one hand, and a graphic, on the other hand. The presentation form preferably depends on the respective data form, i.e. the presentation form is selected by the browser 20 in dependence on the data form to be displayed. The first version v1 is in particular present in text form. A text presentation form is correspondingly used in the browser 20 to display the first version v1. The text presentation form can be implemented by one or more presentation function or presentation routines of the browser 20.

The set configuration parameter value is now checked on the basis of the first version v1 and of a second version v2. The second version v2 is first generated on the basis of the first version v1 for this purpose, with at least the first version v1 being displayed at the display device 16 using a first presentation form of the browser 20 (cf. FIG. 1). The operator of the apparatus 10 then sees the displayed first version v1'. A difference between the first version v1 and the displayed first version v1' can be carried out in different manners on the basis of the first version v1 and of the second version v2.

Figure 2:
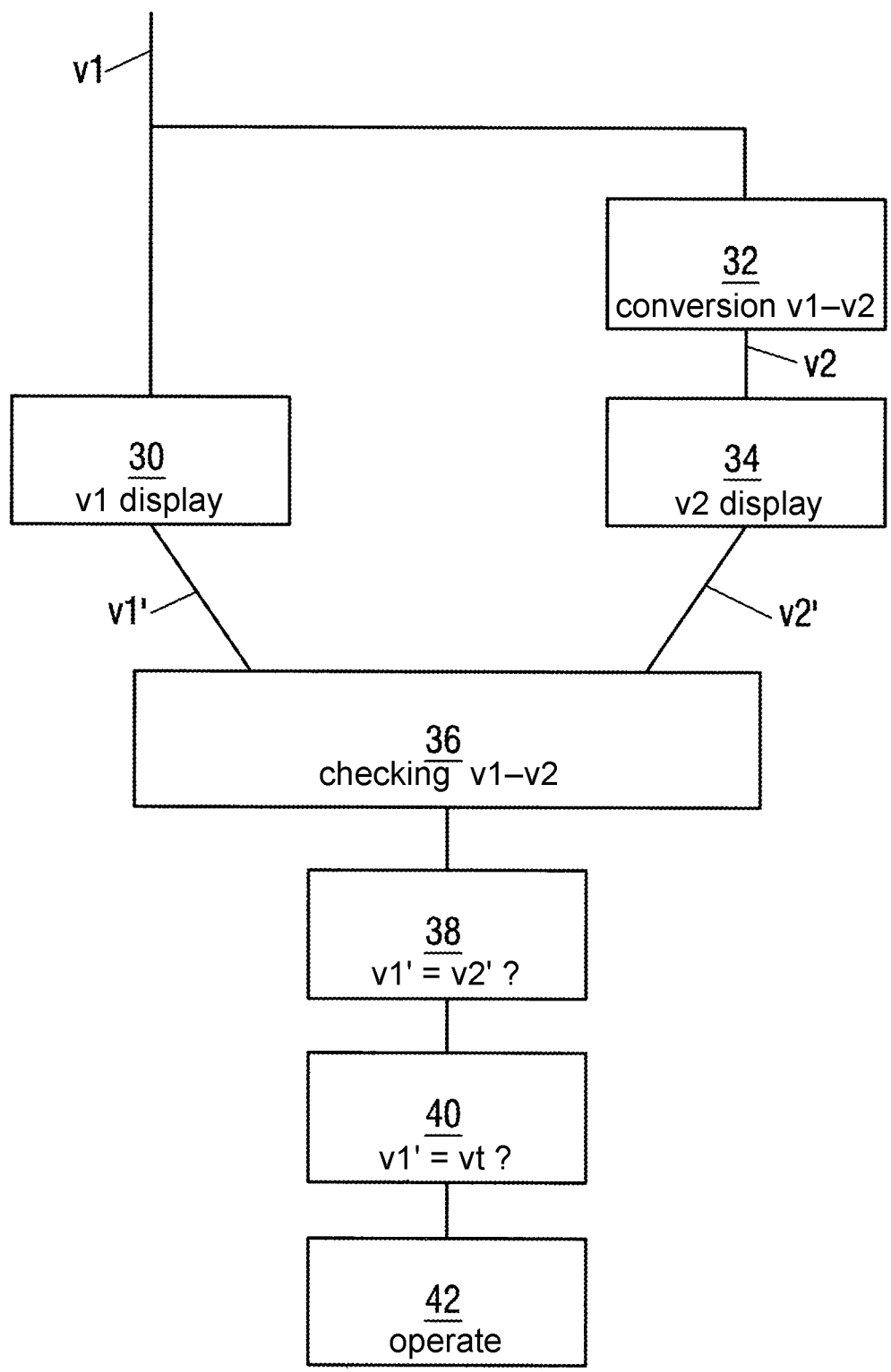
FIG. 2 shows a block diagram to illustrate a method of checking a set configuration parameter value in accordance with a first embodiment.

A first embodiment of the method will be explained with reference to FIG. 2. The method starts from the first version v1 that is displayed via the display device 16 and using the browser 20 (FIG. 1) in step 30. The displayed first version v1' is then visible at the display device 16. In step 32, the first version v1 is converted into the second version v2 using an image generation program or a graphic generation program. The second version v2 represents the set configuration parameter value in the form of an image file or graphic file. The second version v2 is then displayed at the display device 16 and using the browser 20 (step 34). Since the second version v2 is an image file or a graphic file, the browser 20 uses an image generation or graphic generation program to display the second version v2.

The displayed first version v1' and the displayed second version v2' are now checked by the operator of the apparatus 10 in step 36. The operator compares the two versions v1' and v2' with one another and with a wanted desired value vt of the set configuration parameter value for this purpose. In step 38, the operator indicates via two first input elements 22 and 22' whether the first displayed version v1' and the second displayed version v2' are equivalent (cf. FIG. 1). If this is the case, the operator will confirm one of the first input elements 22, otherwise the other first input element 22'. In step 40, the operator should indicate via two second input elements 24 and 24' whether the first displayed version v1' or the second displayed version v2' are equivalent to the wanted desired value vt. If this is the case, the operator will confirm the one second input element 24, otherwise the other second input element 24' (cf. FIG. 1).

In step 42, a decision is made in dependence on the inputs on the operator side via the input elements 22, 22', 24, 24' in the control device 18 whether the apparatus 10 having the sensor 12 is operated in dependence on the first version v1 or not. If the operator indicates an equivalence in step 38 and in step 40 (i.e. the operator actuates the input elements 22 and 24), the apparatus 10 having the sensor 12 is then operated in dependence on the first version v1. An error signal is otherwise generated and the apparatus 10 having the sensor 12 is not operated in dependence on the first version v1. The set configuration parameter value in accordance with the first version v1 is therefore only released for operation when the operator has confirmed the value with respect to its equivalence between the displayed versions v1', v2' and with respect to its amount.

Figure 3:
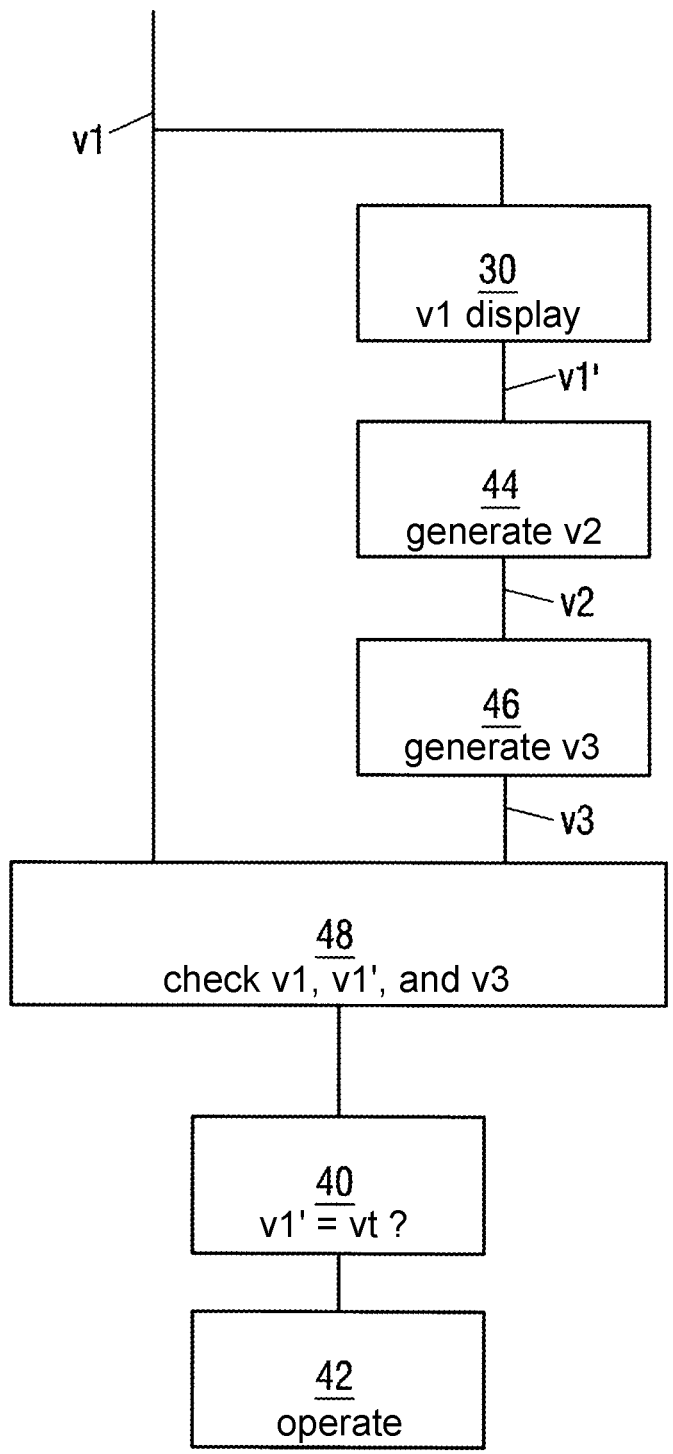
FIG. 3 shows a block diagram to illustrate a method of checking a set configuration parameter value in accordance with a second embodiment.

A second embodiment of the method will be explained with reference to FIG. 3. The second embodiment substantially differs from the first embodiment in that the comparison for equivalence between the first version v1 and the second version v2 is carried out automatically, i.e. a visual check for equivalence of the displayed first version v1' and of the displayed second version v2' is not required. The method starts with the first version v1 that is in turn displayed as the displayed first version v1' in step 30. In step 44, the second version v2 is generated in that an image of the first displayed version v1' that is based on the first version v1 is generated using an imaging program. The second version v2 is then evaluated using a text recognition program (step 46). The evaluation result (i.e. the recognized text) forms a third version v3 of the set configuration parameter value. The third version v3 has the same data form (text form) as the first version v1.

The first version v1 and the third version v3 are checked for equivalence in step 48. If the first version v1 and the third version v3 are equivalent, second input elements 24, 24' are displayed at the display device 16 in a similar manner as in the first embodiment so that the operator can input whether the displayed first version v1' coincides with the desired value vt (step 40). If the operator confirms a coincidence with the desired value vt (actuation of the input element 24), the operation of the apparatus 10 is released with respect to the set configuration parameter value (step 42). An error signal is otherwise generated (in the case of a negative confirmation, i.e. in the case of an actuation of the input element 24'). An error signal is preferably also generated when the automatic comparison of the first version v1 and of the third version v3 has the result that the two versions are not equivalent.

REFERENCE NUMERAL LIST 10 apparatus
12 sensor
14 user interface
16 display device
18 control device
20 browser
22, 22' first input element
24, 24' second input element
30 display of v1
32 conversion of v1 to v2
34 display of v2
36 checking of v1' and v2'
38 input whether v1'=v2'
40 input whether v1'=vt
42 operating the apparatus in dependence on v1
44 generating v2 as an image of v1'
46 generating v3 by evaluating v2
48 checking v1, v1', and v3
v1 first version
v1' displayed first version
v2 second version
v2' displayed second version
v3 third version

The invention claimed is:

1. A method of checking a configuration parameter value set at an electronically configurable apparatus, comprising:
at least one sensor for monitoring a monitored zone,
wherein the apparatus has a user interface having a display device;
wherein the user interface is configured to display a set configuration parameter value using a computer program for presenting data at the display device, with the set configuration parameter value representing a parameter for defining the monitored zone;
wherein the computer program for presenting data at the display device comprises a web browser;
wherein the method comprises:
displaying at least one first version of the configuration parameter value using a first presentation form of the computer web browser, wherein the first version (v1) represents the set configuration parameter value in a first data form;

generating a second version of the set configuration parameter value on the basis of the first version, wherein the first data form is a text form and the second data form is a graphical form;

displaying the second version (v2) of the set configuration parameter value using a second presentation form of the web browser, wherein the second version (v2) represents the set configuration parameter value in a second data form and wherein the second version (v2) is generated in that the first version (v1) is converted into the second version (v2) using a conversion program; and checking the set configuration parameter value on the basis of the first version and at least of the second version, wherein the apparatus has a user interface having a display device and is an industrial machine which is configured to be operated in dependence on the set configuration parameter value, wherein the user interface is configured to display a set configuration parameter value using a web browser for presenting data at the display device, wherein the conversion program is configured to convert the data from the first data form into the second data form;

and wherein the conversion program is independent of the web browser.

2. The method in accordance with claim 1, wherein the first version represents the set configuration parameter value in a first data form.

3. The method in accordance with claim 1, wherein the first version and the second version are displayed together at the display device.

4. The method in accordance with claim 1, wherein the first version and the second version are displayed at the display device in mutually different colors.

5. The method in accordance with claim 1, wherein at least one input element of the user interface is activated to enable the input of a check result by an operator of the apparatus, with the check result being determined at the operator side by a visual check of the set configuration parameter value on the basis of at least one of the displayed first version and the displayed second version.

6. The method in accordance with claim 5, wherein at least one first input element of the user interface is associated with a first check result that is based on a check of the equivalence of the set configuration parameter value between the displayed first version and the displayed second version.

7. The method in accordance with claim 5, wherein at least one second input element of the user interface is associated with a second check result that is based on a check of the equivalence of the set configuration parameter value between the displayed first or second versions and a configuration parameter value desired by the operator.

8. The method in accordance with claim 1, wherein the method further comprises a comparison of the first version and of the second version to determine an equivalence of the set configuration parameter value between the first version and the second version;

and wherein an error signal is generated if no equivalence of the set configuration parameter value is determined between the first version and the second version.

9. The method in accordance with claim 2, further comprising:

generating a third version of the set configuration parameter value on the basis of the second version in that the second version is evaluated with respect to the first data form using an evaluation program, with the third version representing the set configuration parameter value in the first data form; and comparing the first version and the third version to determine an equivalence of the set configuration parameter value between the first version and the third version, with an error signal being generated if no equivalence of the set configuration parameter value is determined between the first version and the third version.

10. The method in accordance with claim 9, wherein the second version is transmitted to a central server via a communication interface of the apparatus, with the evaluation program being carried out on the central server, and with the third version being received by the central server via the communication interface.

11. The method in accordance with claim 9, wherein the first version and the second version are transmitted to a central server via a communication interface of the apparatus, with the evaluation program and the step of comparison of the first version and the third version being carried out on the central server, with a comparison result being received by the central server via the communication interface, and with the comparison result indicating whether an equivalence of the set configuration parameter value has been determined between the first version and the third version;

and wherein the error signal is generated in dependence on the received comparison result.

12. The method in accordance with claim 9, wherein the second version is generated using an imaging program that is configured to generate an image of the first version displayed at the display device;

and wherein the evaluation program is a computer program for automatic text recognition.

13. The method in accordance with claim 8, wherein, if no error signal is generated, at least one input element of the user interface is activated to enable the input of a check result by an operator of the apparatus, with the check result at the operator side being determined by a visual check of the set configuration parameter value on the basis of at least one version of the set configuration parameter value displayed at the display device.

14. An electronically configurable apparatus that is electronically configurable by a configuration parameter value set at the electronically configurable apparatus, wherein the electronically configurable apparatus has a user interface, that has a display device, and a control device;

wherein the user interface is configured to display a set configuration parameter value using a computer program, for presenting data at the display device;

wherein the control device is carries out a method of checking the configuration parameter value set at the electronically configurable apparatus, and wherein the method comprises:

displaying at least one first version of the configuration parameter value using a first presentation form of the computer web browser, wherein the first version (v1) represents the set configuration parameter value in a first data form;

generating a second version of the set configuration parameter value on the basis of the first version, wherein the first data form is a text form and the second data form is a graphical form;

displaying the second version (v2) of the set configuration parameter value using a second presentation form of the web browser, wherein the second version (v2) represents the set configuration parameter value in a second data form and wherein the second version (v2) is generated in that the first version (v1) is converted into the second version (v2) using a conversion program; and checking the set configuration parameter value on the basis of the first version and at least of the second version, wherein the apparatus has a user interface having a display device and is an industrial machine which is configured to be operated in dependence on the set configuration parameter value, wherein the user interface is configured to display a set configuration parameter value using a web browser for presenting data at the display device, wherein the conversion program is configured to convert the data from the first data form into the second data form;

and wherein the conversion program is independent of the web browser.

* * * * *